Feb. 11, 1941.    J. A. HERON    2,231,336
PRODUCTION OF METAL SECTIONS BY EXTRUSION
Filed June 30, 1939
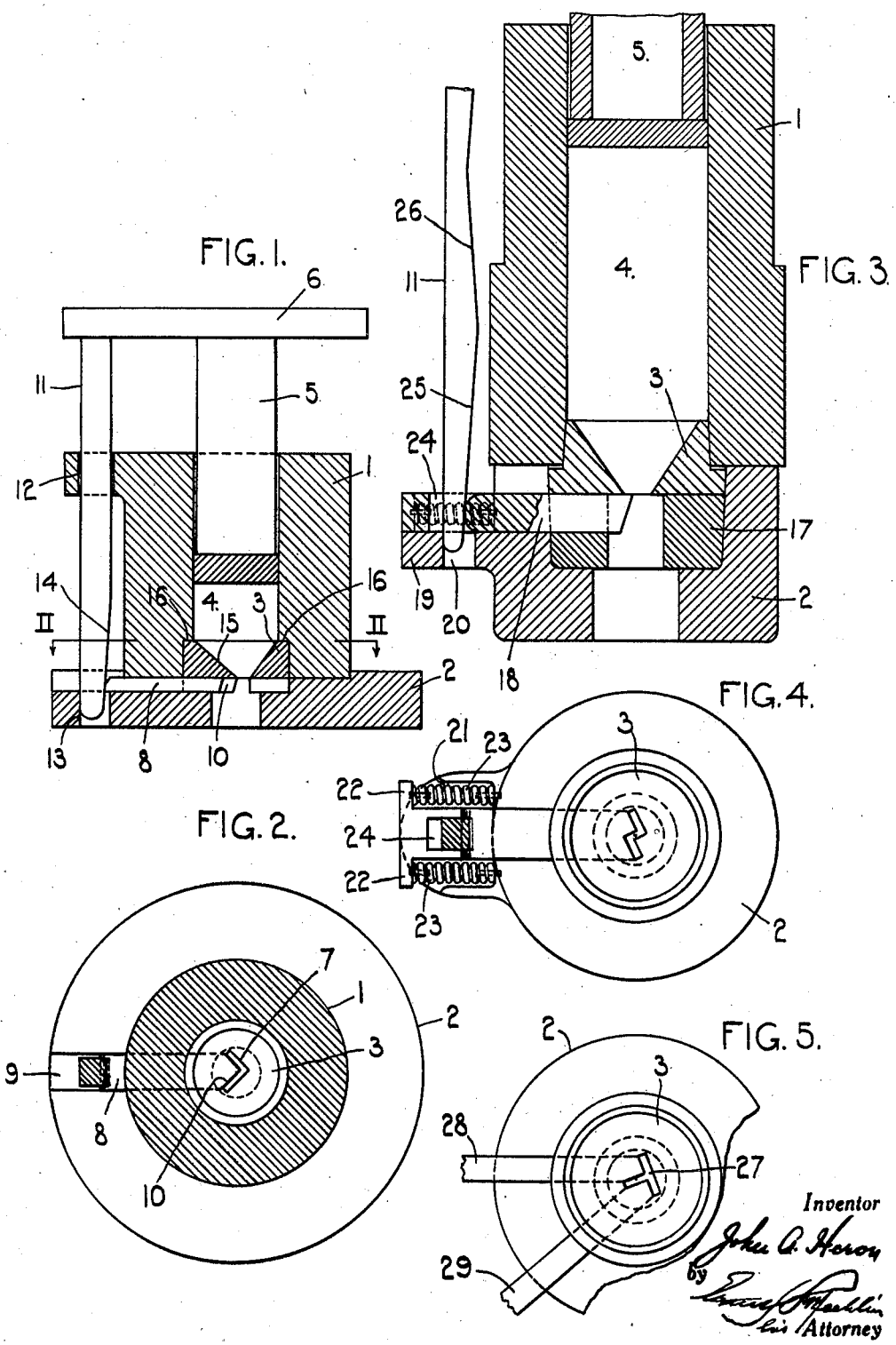
Inventor
John A. Heron
by
Attorney Patented Feb. 11, 1941

2,231,336

UNITED STATES PATENT OFFICE 2,231,336

PRODUCTION OF METAL SECTIONS BY EXTRUSION

John Aherne Heron, Farnham Common, England, assignor to High Duty Alloys Limited, Slough, England Application June 30, 1939, Serial No. 282,262
In Great Britain September 13, 1938

7 Claims. (Cl. 207—9)

This invention relates to the production of metal sections by extrusion and has more especial reference to the extrusion of tapering sections of aluminium and like light alloys.

In the customary method of extruding metals, the hot billet is placed in a container and a ram forces it forward against the inner surface of the die, or a hollow ram forces the die against the billet so that the metal is extruded through the die aperture.

Where a tapering section is required, it has hitherto been necessary to roll down or machine the straight extruded section although it has been proposed to extrude metal sections with progressively diminishing thickness of metal, through a die with which co-acts a tapering mandrel carried by the ram of the press.

The present invention has for its main object to provide an improved method and apparatus for the direct extrusion of metal or alloy articles of tapering or it may be, other non-uniform or variable section.

Further and favourable objects will appear appear from the following description.

In the method of extrusion according to the present invention, the die is furnished with a movable segment or segments and as the extrusion proceeds the die aperture is adapted to be modified or varied so as to impart the tapered or other required change in section to the extruded article.

When applied to direct extrusion machines the invention may provide a die which itself is movable and which under the force applied to extrude the metal moves forward a relatively short distance, sliding segments fitted into the die riding on guideways during this movement, the guideways being so formed that they cause the sliding segments to move inwardly or outwardly according as it is desired that the cross-section of the extrusion be decreased or increased. In certain cases it may be desirable so to form the guideways that the movement of one or more segments tends to thicken or enlarge one portion or some portions of the extrusion whilst the movement of another or others tends to decrease another portion or other portions.

Alternatively the die may be stationary and the guideways may be formed as extensions on the ram so that in the forward movement of the latter forcing the billet against the die, the segments are driven inwardly or outwardly to modify the aperture and achieve a similar result.

As a further alternative the guideways may form a cam surface operating a lever in turn actuating the sliding segment or segments.

When applied to the inverted extrusion process where a container having a closed rear end is utilised in conjunction with a hollow ram driving the die rearwardly towards such closed end, the guideways may be formed on the interior wall of the container or its liner, the segments being forced inwardly or outwardly during the rearward movement of the die progressively to modify the aperture as the extrusion proceeds.

In a specific embodiment of the invention applied to a direct extrusion machine where it is desired to produce an extrusion which can be cut into a plurality of tapering angle sections, in order to ensure that the movement of the die segment shall be uniform to produce a uniform taper on the extruded article, there is associated with the ram an actuator for the segment such that the latter is projected into and withdrawn from the die aperture at a uniform rate during the stroke of the ram so as uniformly to increase and diminish the die aperture as extrusion proceeds.

This embodiment has the advantage of enabling the standard bolster and container of the customary direct extrusion press to be utilised, the only parts requiring modification being the die holder, the die and segments therefor.

The invention will be further described with reference to the accompanying explanatory drawing which illustrates partly diagrammatically and by way of example several embodiments of the invention applied to direct extrusion presses, and in which—

Figs. 1 and 2 are respectively a vertical section and a cross section on the line II—II of an extrusion press adapted for the production of a simple tapering angle section.

Figs. 3 and 4 are corresponding views of a press arranged for the continuous production of double tapering Z sections, while Fig. 5 is a view corresponding to Fig. 4 diagrammatically indicating the arrangement adopted where it is desired to extrude a variable T section.

Referring now to the drawing but first more particularly to Figs. 1 and 2, the container or cylinder of the press generally designated 1 is secured with its axis vertical to a bolster or die holder 2 which removably mounts the die 3 at the lower end of and in alignment with the bore 4 of the press. 5 indicates the ram closely fitting such bore and slidable downwardly therein under the influence of a platen 6 which may be operated hydraulically or in other conventional manner.

As shown more clearly in Fig. 2, the die 3 is furnished with an aperture 7 corresponding to the major dimension of the angle section to be extruded and associated with such die is a slidable segment 8, such segment being carried in a guide-way 9 in the bolster with its axis bisecting the angle formed by the die aperture 7.

The nose of the segment 8 is V-shaped, as shown at 10 in Fig. 2, and is normally free of the die aperture which as aforementioned, corresponds to the major dimension of the section to be extruded. As the extrusion proceeds, however, the segment 8 is slidden inwardly so that its nose 10 projects within the die aperture 7 thus reducing the effective size of such aperture and consequently the thickness of the section extruded.

To effect the inward sliding movement of the segment 8 recourse is had in the press in question to an extension or actuator 11 carried by the platen 6 and moving in consonance with the ram 5, the actuator 11 reciprocating in guideways 12 and 13 formed for the purpose in the container 1 and bolster 2 respectively and having a wedge or inclined surface 14 which bears on the outer end of the segment 8 and as the ram moves downwardly during extrusion slides such segment inwardly and thus imparts a tapering section to the extrusion.

It will be noted that the die 7 is furnished with convergent walls 15 whereby uniform flow of the metal during extrusion is ensured and a satisfactory grain structure for the extruded product obtained, the open rear end of the die exactly fitting the bore 4 of the container and the rear face 16 being rebated to ensure that the convergent walls 15 provide a smooth continuation of the press bore.

With the actuator 11 for the segment 8 furnished with a simple wedge or inclined surface 14 only sections of gradually diminishing or conversely gradually increasing dimensions can be extruded and where it is desired to extrude as continuous lengths a plurality of oppositely tapering sections which may subsequently be cut to provide separate identical articles, resort may be had to the press arrangement illustrated in Figs. 3 and 4.

By way of example the die shown is intended for the production of Z-sections although it will be understood that an angle, T, H or other appropriately apertured die may be utilised, dependent on the section to be extruded.

1 again represents the container, 2 the bolster, 3 the die, 4 the press bore and 5 the ram.

The die 3 in this case is carried by a die holder 17 recessed in the bolster 2 and serving conveniently to guide the sliding segment 18.

The bolster 2 is formed with a lateral projection 19 having an aperture 20 to guide the actuator 11 and formed on its upper surface with a slot or recess 21 in which the segment 18 slides.

At its outer extremity the segment 18 is formed with lateral ears or projections 22 against which bear compression springs 23 abutting with the cylindrical external wall of the bolster and located in the recess 21 aforementioned, such springs tending to urge the segment 18 outwardly so that it is free of the aperture in the die 3. Adjacent the guide 20 the actuator 11 passes through a slot 24 provided for the purpose in the segment 18 and as the actuator 11 is furnished with oppositely inclined surfaces 25 and 26 and moves in consonance with the ram, it will be appreciated that the segment 18 is uniformly projected within the aperture of the die 3 and then progressively withdrawn from such aperture as the extrusion proceeds so that the section of the extrusion gradually diminishes and then gradually increases, this cycle being repeated where the inclined faces 25 and 26 on the actuator 11 are duplicated.

It will be understood that although the actuator 11 is conveniently coupled to move in unison with the ram 5, it may be arranged to travel in any predetermined relative ratio thereto.

In both embodiments described the required variation in section may be achieved with a single sliding segment but it may be found necessary, for instance, in the production of variable T-sections, to furnish a plurality of such segments as shown in Fig. 5.

Referring now to Fig. 5, the T-shaped die aperture 27 corresponds to the major dimensions of the article to be extruded, 28 and 29 representing slidable segments with their axes inclined to each other, each of which may be furnished with an actuator 11 operating as heretofore described and varying the thickness of all the walls of the section as extrusion proceeds.

While normally the segments 28 and 29 will be arranged to move in unison there may be cases where it is desirable for one wall of the section to diminish in thickness as another or others increases, and this may be readily achieved by correlating the inclined surfaces of the actuators 11 for the respective segments.

Moreover it will be understood that instead of the inclined surfaces actuating the segments directly, they may do so through an intermediate pivoted lever system fulcrumed on the bolster of the press and furnished, if desired, with an anti-friction roller or rollers bearing on the inclined surfaces, a similar effect being achieved.

While the specific embodiments described and illustrated are vertical presses, it will be appreciated that the invention is not limited in this respect but is also applicable to horizontal or indeed any form of extrusion press.

By the present invention tapering and other variable section metal or alloy articles may be produced by simple extrusion thus effecting considerable saving in the cost of manufacture.

What I claim is:

1. Apparatus for extruding metal sections comprising a container for a heated billet, a die and a ram or plunger adapted to extrude the metal of the billet through an aperture in the die, wherein the die is furnished with or has associated with it a movable segment or segments adapted to vary the effective aperture as extrusion proceeds and thus to impart a tapered or variable section to the article extruded.

2. Apparatus for extruding metal sections according to claim 1 wherein the segment or segments is or are mounted slidably in relation to the die, and actuating mechanism is provided for projecting the segment or segments into the die aperture and/or withdrawing it or them therefrom as extrusion proceeds.

3. Apparatus for extruding metal sections according to claim 1, wherein the segment is furnished with actuating mechanism including a wedge or inclined surface moving in consonance with the ram and operating to impart a predetermined movement to the segment for each progressive stage in the travel of the ram, thereby to control the degree of taper or variation in the section of the extruded article.

4. Apparatus for extruding metal sections according to claim 1, including actuating mechanism for the sliding segment comprising an arm having an inclined surface in contact with the segment and moving with and at the same speed as the ram, so that during the downward stroke of the ram the segment is progressively slidden from a position in which the die aperture is left free for extrusion to one in which the effective aperture is reduced by the projecting end of the segment.

5. Apparatus for extruding metal sections according to claim 1, wherein the die aperture is of the same shape and size as the major dimension of the section to be extruded, e. g., angle, H, Z or T section, and the nose or portion of the segment adapted to project within such aperture is correspondingly shaped.

6. Extrusion apparatus according to claim 1, including actuating mechanism for the sliding segment adapted successively to project such segment into the die aperture and to withdraw it therefrom as extrusion proceeds, whereby variable sections may be continuously produced.

7. Apparatus for extruding metal sections according to claim 1, wherein the die is furnished with convergent walls between the bore of the container and its aperture, thus to assist uniform flow of the metal during extrusion and impart a satisfactory grain structure to the extruded product.

JOHN AHERNE HERON.